(12) United States Patent
Arola et al.

(10) Patent No.: US 10,528,172 B2
(45) Date of Patent: Jan. 7, 2020

(54) PRESSURE SENSOR FOR DISPLAY DEVICES

(71) Applicant: Microsoft Technology Licensing, LLC, Redmond, WA (US)

(72) Inventors: Joni Arola, Tampere (FI); Marko Heikkinen, Tampere (FI)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 207 days.

(21) Appl. No.: 15/185,999

(22) Filed: Jun. 17, 2016

(65) Prior Publication Data

US 2017/0364189 A1    Dec. 21, 2017

(51) Int. Cl.
*G06F 3/041* (2006.01)
*G06F 3/044* (2006.01)

(52) U.S. Cl.
CPC .......... *G06F 3/0414* (2013.01); *G06F 3/044* (2013.01)

(58) Field of Classification Search
CPC .............................. G06F 3/0414; G06F 3/044
USPC ........................................................ 345/174
See application file for complete search history.

(56) References Cited

U.S. PATENT DOCUMENTS

| | | | |
|---|---|---|---|
| 4,216,547 A | * | 8/1980 | Picchione .......... A41D 13/0015 2/22 |
| 5,657,607 A | | 8/1997 | Collins et al. |
| 6,163,313 A | * | 12/2000 | Aroyan .................. G06F 3/045 178/18.04 |
| 7,453,444 B2 | | 11/2008 | Geaghan |
| 7,724,243 B2 | | 5/2010 | Geaghan |
| 7,923,393 B2 | | 4/2011 | Son et al. |
| 8,067,883 B2 | | 11/2011 | Wang |

(Continued)

FOREIGN PATENT DOCUMENTS

| | | |
|---|---|---|
| CN | 203422726 | 2/2014 |
| KR | 20120021721 | 3/2012 |
| WO | WO2015/101700 | 7/2015 |

OTHER PUBLICATIONS

Chen, et al., "'Flexible Displays: Flexible AMOLED Manufacturing'", Published on: Aug. 18, 2015, Available at: http://link.springer.com/referenceworkentry/10.1007/978-3-642-35947-7_213-1, Aug. 18, 2015, 3 pages.

(Continued)

*Primary Examiner* — Benyam Ketema
(74) *Attorney, Agent, or Firm* — Alleman Hall Creasman & Tuttle LLP

(57) ABSTRACT

Technologies are described for pressure sensors used in display devices. In one embodiment, a reference ground layer and sensing pad can be positioned between a display substrate and a window substrate. Additionally, a compression region can be positioned between the display substrate and the window substrate. The compression region can be compressed so as to change a distance between the reference ground layer and the sensing pad. By placing the compression region between the window substrate and the display substrate, the air gap below the display substrate can be removed. In still another embodiment, the sensing pad is aligned over a frit layer, but it is divided into spaced-apart sub-regions that are serially coupled together. Gaps between the sub-regions are sized such that the laser can adequately penetrate through the sensor pad to melt the frit.

12 Claims, 8 Drawing Sheets

(56) References Cited

U.S. PATENT DOCUMENTS

| | | | |
|---|---|---|---|
| 8,570,449 B2 | 10/2013 | Abileah et al. | |
| 8,599,142 B2 | 12/2013 | Prados et al. | |
| 8,633,915 B2 | 1/2014 | Hotelling et al. | |
| 8,847,670 B2 | 9/2014 | Hisatsugu | |
| 8,922,523 B2 | 12/2014 | Lynch et al. | |
| 8,988,384 B2 | 3/2015 | Krah et al. | |
| 9,223,450 B2 | 12/2015 | Heo et al. | |
| 2004/0233174 A1 | 11/2004 | Robrecht et al. | |
| 2005/0285519 A1* | 12/2005 | Cok | H01L 51/529 313/512 |
| 2006/0132462 A1 | 6/2006 | Geaghan | |
| 2010/0024573 A1 | 2/2010 | Daverman et al. | |
| 2012/0049728 A1* | 3/2012 | Lee | H01J 9/241 313/512 |
| 2012/0212445 A1 | 8/2012 | Heikkinen et al. | |
| 2012/0222498 A1 | 9/2012 | Mamigonians | |
| 2013/0050155 A1* | 2/2013 | Petersen | B81B 7/0067 345/204 |
| 2013/0076375 A1 | 3/2013 | Hanumanthaiah et al. | |
| 2013/0104980 A1 | 5/2013 | Sridharan et al. | |
| 2013/0114219 A1* | 5/2013 | Garner | G02F 1/133308 361/750 |
| 2013/0127879 A1 | 5/2013 | Burns et al. | |
| 2013/0234973 A1 | 9/2013 | Kim et al. | |
| 2014/0002371 A1 | 1/2014 | Allen | |
| 2014/0022191 A1 | 1/2014 | Yun | |
| 2014/0028582 A1 | 1/2014 | Choi | |
| 2014/0062933 A1 | 3/2014 | Coulson et al. | |
| 2014/0104184 A1 | 4/2014 | Meador et al. | |
| 2014/0218328 A1 | 8/2014 | Haapakoski et al. | |
| 2014/0238152 A1 | 8/2014 | Kallassi et al. | |
| 2014/0267128 A1* | 9/2014 | Bulea | G06F 3/044 345/174 |
| 2014/0347309 A1 | 11/2014 | Mockarram-Dorri | |
| 2014/0368749 A1 | 12/2014 | Alonso et al. | |
| 2015/0034934 A1 | 2/2015 | Rohatgi | |
| 2015/0069618 A1 | 3/2015 | Gudeman et al. | |
| 2015/0325634 A1* | 11/2015 | Chao | H01L 27/124 349/43 |
| 2015/0338958 A1 | 11/2015 | Decaro et al. | |
| 2015/0355751 A1 | 12/2015 | Kurasawa et al. | |
| 2015/0370376 A1* | 12/2015 | Harley | G06F 3/0414 345/174 |
| 2015/0370396 A1 | 12/2015 | Hotelling et al. | |
| 2016/0092015 A1 | 3/2016 | Al-Dahle et al. | |
| 2016/0098131 A1 | 4/2016 | Ogata et al. | |
| 2016/0245709 A1* | 8/2016 | Pagani | G01L 1/18 |
| 2016/0291719 A1* | 10/2016 | Lee | G06F 3/044 |
| 2017/0371441 A1 | 12/2017 | Heikkinen et al. | |

OTHER PUBLICATIONS

McCutcheon, "Keep in "Touch" With EMI Solutions for Today's Displays", Published on: Dec. 13, 2010; Available at: http://multimedia.3m.com/mws/media/703393O/mobile-dev-design-reprint-keep-in-touch-with-emi-solutions.pdf, 5 pages.

"Non Final Office Action Issued in U.S. Appl. No. 15/189,944", dated Mar. 22, 2018, 15 Pages.

"International Search Report and Written Opinion Issued in PCT Application No. PCT/US2017/036934", dated Aug. 23, 2017, 14 Pages.

"Final Office Action Issued in U.S. Appl. No. 15/189,944", dated Oct. 9, 2018, 18 Pages.

* cited by examiner

PRESSURE SENSOR FOR DISPLAY DEVICES

BACKGROUND

Display devices are increasing in importance due to the wide-spread use of mobile devices, such as cell phones. There are numerous types of displays including Organic Light-emitting Diode (OLED) displays, Light-emitting Diode (LED) displays and Liquid Crystal Displays (LCD). The displays are used in a wide-range of applications, including consumer devices such as cell phones, gaming devices, watches, etc. The OLEDs use thin-film transistors in a backplane that switch pixels on or off so as to generate images on the display. LCDs, by contrast, typically use a backlight in conjunction with light-modulating properties of liquid crystals. Often the displays include multiple layers of glass. For example, an OLED display assembly can include a cover glass (also called a "window"), an encapsulation glass, and a Low-Temperature Polycrystalline Silicon (LTPS) glass.

In the manufacture of displays, frit is often used as an intermediate material in binding pieces of glass together. The frit is a ceramic composition that, when heated, melts to hermetically bind the glass pieces. The frit is often melted with a laser that is passed over the frit near the edges of the display. While the laser melts the frit, it can also damage any signal traces that overlap the frit, such as touch traces. Pressure sensors can also be located in the area of the frit and can, likewise, be damaged by the laser as it melts the frit. In addition, the pressure sensors are a conductive (metal) layer and can block the laser from the frit. As such, the unmelted frit will not adequately bind the pieces of glass together. For this reason, the pressure sensor pads are limited to a display area where they do not interfere with the laser.

Regardless of location, any capacitance-based pressure sensors often require an air gap below a display substrate so that a distance between a reference ground and a sensing pad can be changed. The air gap adds to the integrated height of the display and restricts how thin a final device can be manufactured.

Therefore, there exists ample opportunity for improvement in technologies related to pressure sensors.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies are described for pressure sensors used in display devices. In one embodiment, a reference ground layer and sensing pad can be positioned between a display substrate and a window substrate. Additionally, a compression region can be positioned between the display substrate and the window substrate. The compression region can be compressed so as to change a distance between the reference ground layer and the sensing pad. As such, a capacitance reading from the sensing pad can indicate a level of force being applied to the window substrate.

In another embodiment, the compression region is an adhesive, polymer or a combination thereof. Such an adhesive or polymer is typically used between the window substrate and the display substrate, but its compressible properties have not been utilized for purposes of sensing pressure. In this way, an air gap typically below the display substrate can be eliminated.

In still another embodiment, the sensing pad is aligned over a frit layer, but it is divided into spaced-apart sub-regions that are serially coupled together (in terms of electrical properties). Gaps between the sub-regions are sized such that the laser can adequately penetrate through the sensor pad to melt the frit. As such, the sensor pad becomes partially transparent to the laser for purposes of melting the frit. In another embodiment, electrical traces between the serially coupled sub-regions can be angled to as to minimize damage to the traces due to the laser.

As described herein, a variety of other features and advantages can be incorporated into the technologies as desired.

DETAILED DESCRIPTION

Figure 1:
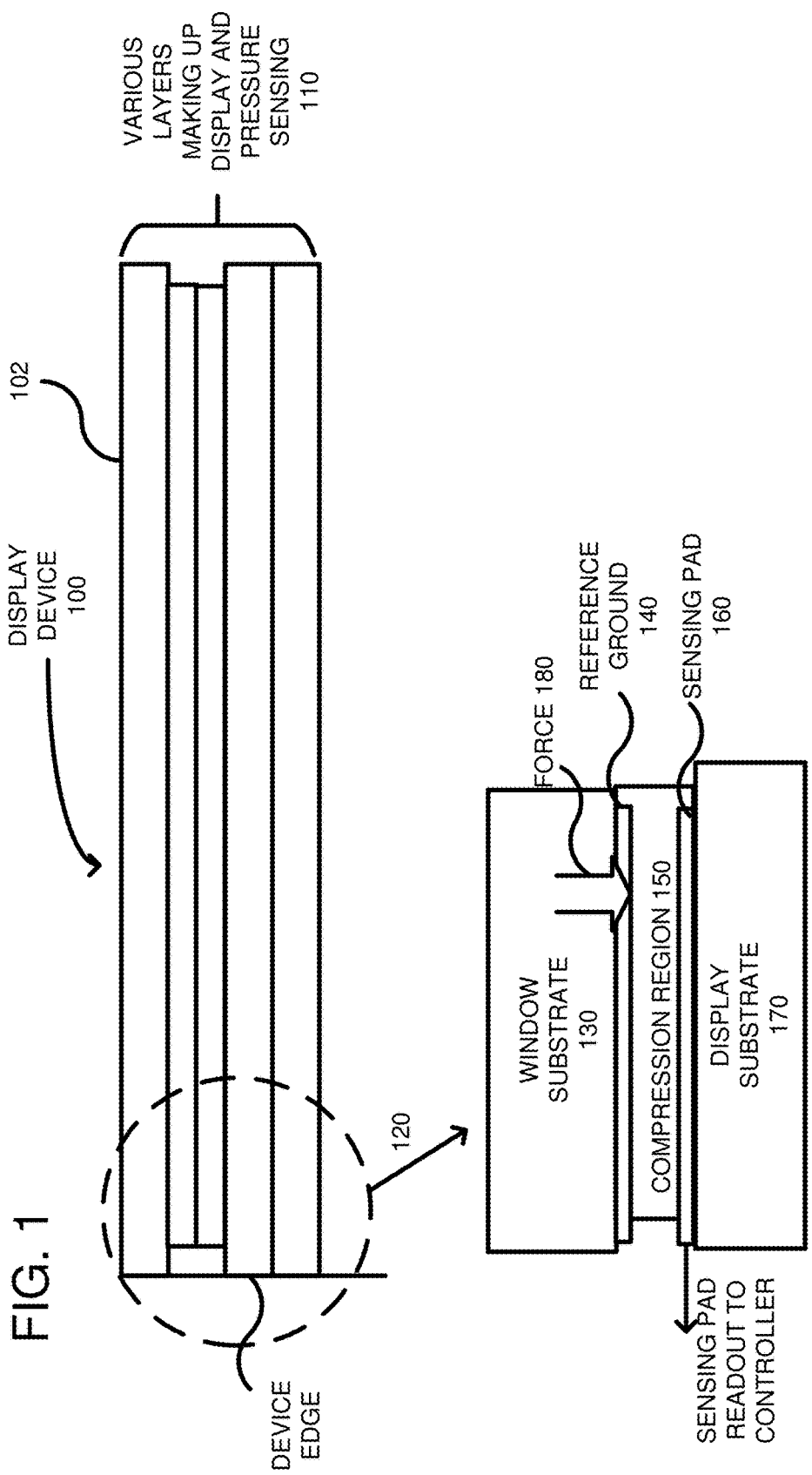
FIG. 1 is a diagram of a display device according to one embodiment with a reference ground layer and a sensing pad positioned between a window substrate and a display substrate.

FIG. 1 is a display device (or assembly) 100 that can receive touch input and detect an amount of force thereon through a user press on a cover window 102. The display 100 can be used in a wide-range of applications, including consumer devices, such as cell phones, gaming devices, watches, etc. As shown at 110 generally, the display device is made up of numerous layers, which can include one or more of the following: a glass layer or a substrate layer (e.g., plastics or other transparent materials), a polarizing layer, a compression layer, an adhesive layers and a pressure sensor layer all of which are described further below.

In this embodiment, the specific layers for an end of the display are shown at 120. The specific layers include a window substrate 130, a reference ground 140, a compression region 150, a sensing pad 160, and a display substrate 170. It should be understood that at other locations, such as at the middle of the display device 100, the layers can be different. One example of such a difference is that the sensing pad 160 is located at the end (or edges) of the display device 100, but need not be at other locations. The window substrate 130 is often called a "cover" glass and can be made of glass, acrylic, polycarbonate, a variety of plastic materials, or other transparent materials.

The reference ground 140 is a layer metal, conductive material, such as copper, and can be coupled directly to the window substrate. In alternative embodiments, there can be an intermediate layer between the window substrate 130 and the reference ground layer 140. In any event, the reference ground 140 is positioned between the window substrate 130 and the display substrate 170. The compression region 150 can be a compressible adhesive, such as a clear optical adhesive, a polymer, or a combination of an adhesive and a polymer. The compression region can deform and spring back based on a pressure exerted on the window substrate 130. For example, if a user presses on the window substrate 130, such pressure extends to the end (or edges) of the display and a downward force, shown by arrow 180, is exerted on the compression region. The compression region 150 then compresses such that its width becomes less so that a distance between the reference ground 140 and the sensing pad 160 is reduced. Correspondingly, a capacitance formed by the reference ground layer 140 and the sensing pad 160 also changes. The amount of capacitance change corresponds directly to the force 180 applied. As such, an amount of pressure exerted on the window substrate by the user is detectable.

The sensing pad 160 is made of an electrically conductive material, such as copper. Additionally, the sensing pad is coupled to a controller (not shown in this figure) so that the controller can read a capacitance change formed between the reference ground 140 and the sensing pad 160. The sensing pad 160, in this embodiment, can be directly adjacent to the display substrate 170. In other embodiments, the sensing pad 160 can have one or more layers between it and the display substrate 170. The display substrate 170 can be an appropriate substrate for implementing OLED displays, including active-matrix organic light-emitting diode (AMOLED), LED displays, LCDs, etc. As such, the display substrate 170 can be formed from multiple layers of glass or other substrates, such as plastic. For example, an OLED display can be formed from an encapsulation glass and an LTPS glass. Other combinations can be used. The sensing pad 160 and the reference ground 140, together form a pressure sensor. One advantage of the display device 100 is that it does not require an air layer below the display substrate 170 in order to implement a pressure sensor.

Figure 2:
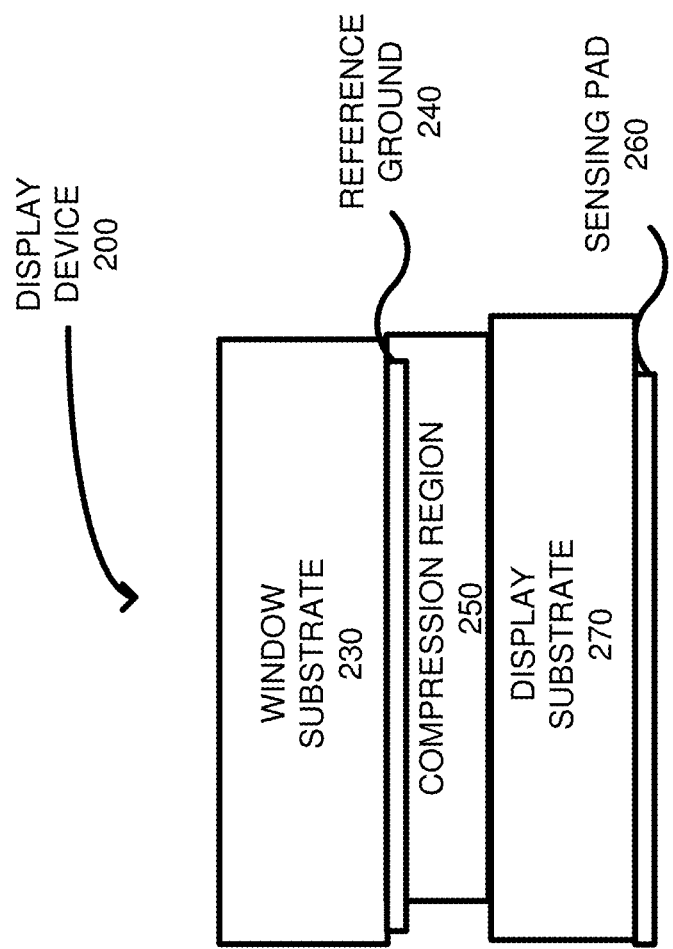
FIG. 2 is a diagram of a display device according to another embodiment wherein the reference ground and a compression region are positioned between the window substrate and the display substrate.

FIG. 2 shows another embodiment of a display device 200. In this embodiment, a window substrate 130, similar to FIG. 1, is used as a cover substrate for the display device 200. A reference ground 240 is shown adjacent to the window substrate 230, but intermediate layers can be positioned between the reference ground layer 240 and the window substrate 230. A compression region 250, similar to the compression region 150, is shown positioned between the window substrate 230 and a display substrate 270. The compression region 250 can be adjacent to the display substrate 270 or intermediate layers can be positioned between the compression region and the display substrate. A sensing pad 260 is shown below the display substrate 270. The sensing pad 260 can be similar to that of FIG. 1. Thus, the sensing pad 260 can be below the display substrate 270, as in FIG. 2 or above the display substrate as in FIG. 1. Generally, the reduced distance between the reference ground and the sensing pad in FIG. 1 provides greater sensitivity for the pressure sensor.

Figure 3:
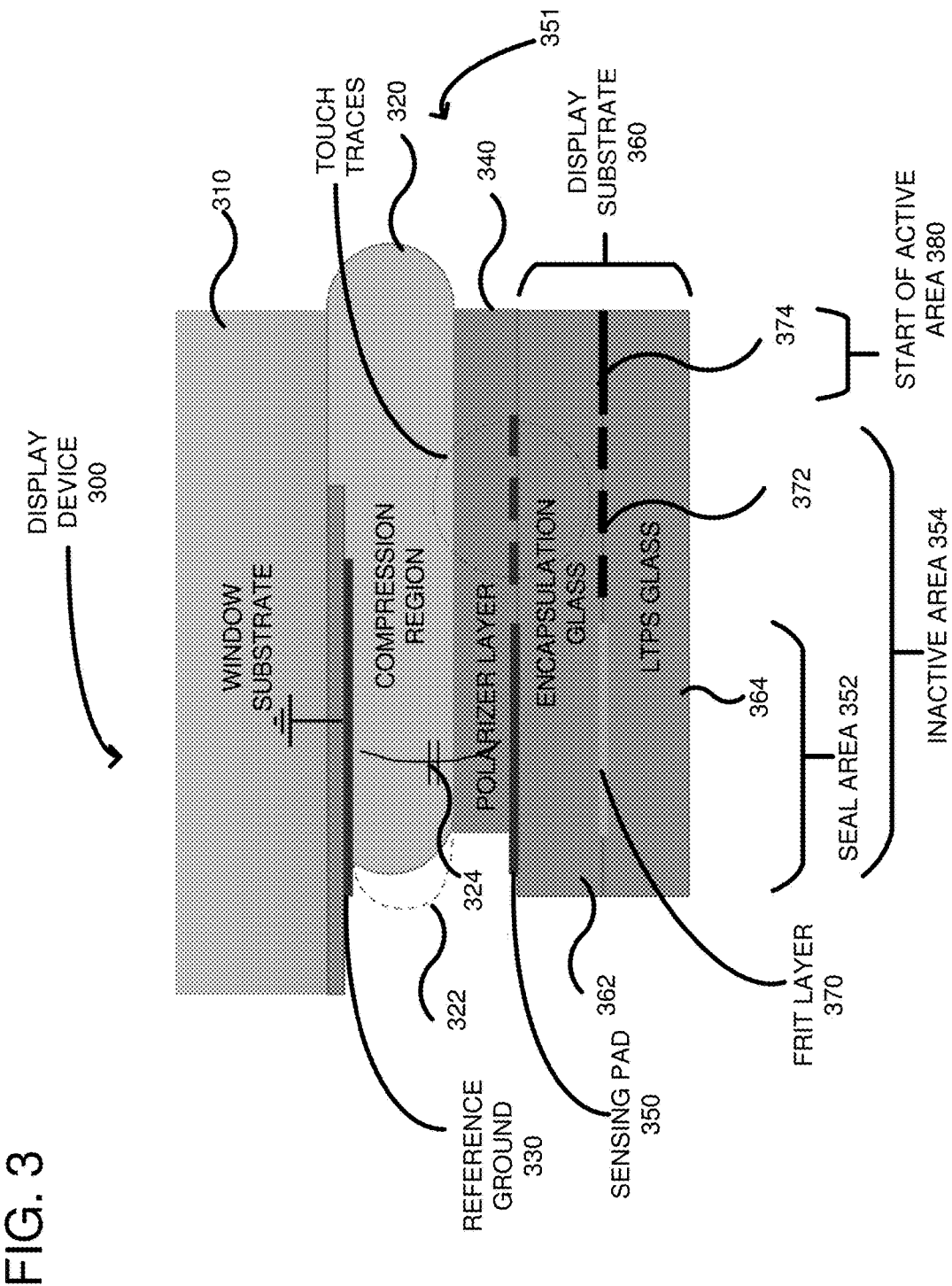
FIG. 3 shows a diagram of a display device for an OLED-type display including a pressure sensor.

FIG. 3 shows a detailed embodiment of an OLED-type display device 300 and, in particular, an AMOLED. FIG. 3 represents an end (or edge) area of the display device. In this embodiment, the window substrate 310 is a glass material, but other transparent materials, such as a plastic, can be used. The thickness of the window substrate depends on the particular design. A compression region 320 is positioned below the window substrate 310. The compression region 320 is an adhesive material, a polymer material or a combination thereof. As shown at 322 by the dashed line, the compression region can deform so as to have a reduced thickness under downward pressure exerted upon it by the window substrate 310. A reference ground layer 330 is positioned between the window substrate 310 and the compression region 320. The reference ground layer 330 can be any desired length and is generally sized to be commensurate with a sensing pad 350. The sensing pad 350 and the reference ground 330 extend in the seal area 352 and are generally positioned within an inactive area 354 of the display device (or assembly) 300. The inactive area 354 is an area wherein visual elements are not depicted on the display and/or touch commands cannot be received. The reference ground layer 330 and the sensing pad 350 form a capacitor, as shown at 324, with a dielectric including the compression region 320. Thus, together, the sensing pad 350, the reference ground 330, and the compressible region 320 form a pressure sensor 351. A polarizer layer 340 is positioned between the sensing pad 350 and the compression region 322. The polarizer layer 340 enhances the contrast of a display substrate 360. The display substrate 360 includes multiple pieces of glass including an encapsulation layer 362 and an LTPS glass layer 364. The LTPS glass layer 364 can be called a display substrate coupled to an encapsulation substrate. A frit layer 370 is positioned between the encapsulation glass 362 and the LTPS glass 364. Generally, the frit layer 370 is melted by a laser to bond together the encapsulation glass 362 and the LTPS glass 364. The LTPS glass 364, encapsulation glass 362 and polarizer 340 together form an AMOLED display. The display substrate 360 includes LTPS related traces 372 within the inactive area 354 and display generation elements 374, which represents the start of an active area 380. One advantage of this embodiment is that the sensing pad 350 and reference ground 330 are positioned between the window substrate 310 and the encapsulation glass 362. Such a structure eliminates a need for an air gap for forming a pressure sensor.

Figure 4:
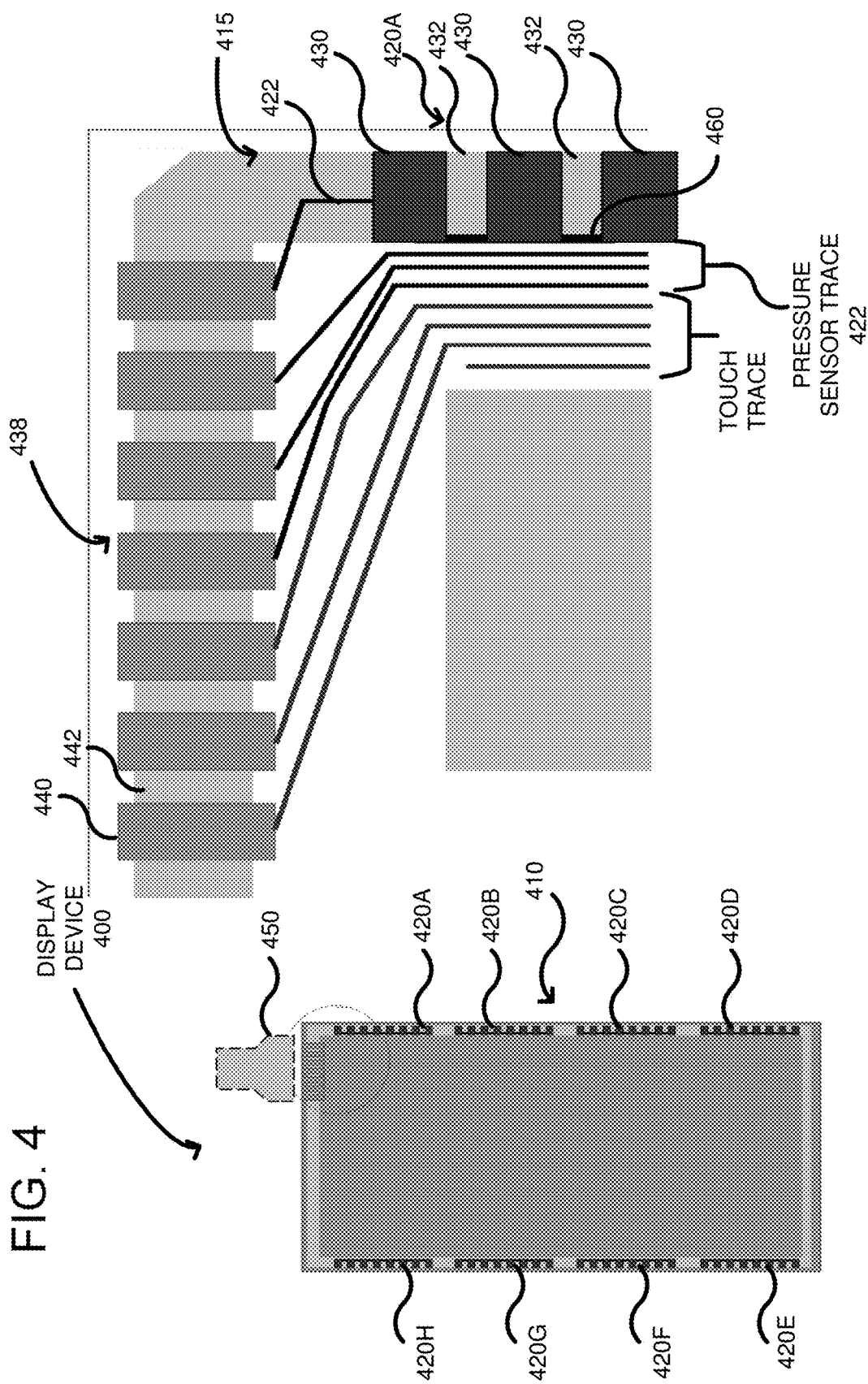
FIG. 4 is a diagram showing a sensor pad divided into sub-regions so as to allow a laser to melt frit positioned below the sensor pad.

FIG. 4 shows another embodiment of a display device 400 and a pressure sensor 410. The pressure sensor 410 is formed by groups of sensing pads, shown at 420A-H. Each group of pads has a pressure sensor output trace 422. A particular sensing pad 420A is shown in an enlarged view at 415. The sensing pad 420A includes spaced-apart sub-portions 430 that are conductive. Each of the sub-portions 430 has a gap 432 there between. The gaps 432 are sized so that a laser can continuously melt frit as a laser passes over the sub-portions. In this way, the sensor pad 420A is transparent to the laser. The output traces 422 are coupled to touch connection pads or area 438 in a one-to-one relation so that each sensing pad 420A-H of the pressure sensor 410 can be individually analyzed. The sizing of the sub-portions 430 and the sizing of the gaps 432 can be the same as the sizing of the touch connection pads or area 438, such as touch connection pad 440, and the gaps, such as gap 422, between the touch connection pads. Alternatively, the sizing of the gaps 432 and the width of the sub-portions 430 can be different than the touch connection pads or area 438. The particular gap and sub-portion sizing depends on the design. The touch connection pads or area are coupled to a touch flex 450, which is in turn connected to a controller. Each sensing pad 420A-420H is coupled in parallel to the touch flex 450. Sub-portions 430 of the sensing pad 420A are coupled in series via traces, such as trace 460. Thus, the sensing pad 420A acts as a unitary sensing pad despite that it has gaps 432 there between.

Figure 5:
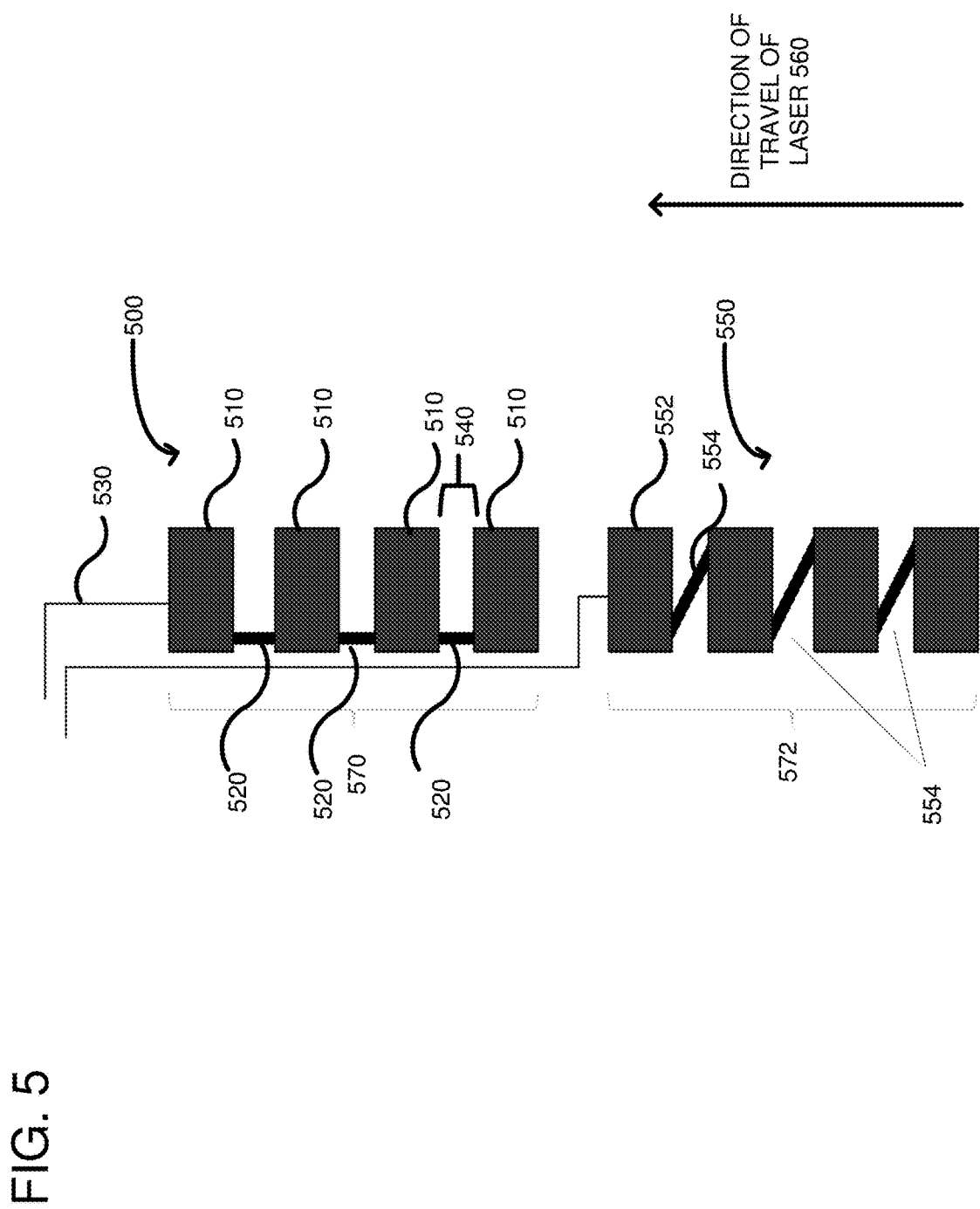
FIG. 5 is a diagram showing potential electrical connections between the sub-regions of FIG. 4.

FIG. 5 shows different configurations of sensing pads 500 that can be used in a pressure sensor. The sensing pads include conductive pads 510 (which are sub-portions of the sensing pads) and traces 520 (which are electrical connections) there between. The conductive pads 510 are adequately sized so as to be functional as a capacitor to detect a change in distance between the conductive pads 510 and a reference ground layer (such as is shown at 330 in FIG. 3). The traces 520 couple all of the conductive pads in series to provide a single sensing pad output 530. In the illustrated configuration, the traces 520 are a direct connection to the conductive pads 510 meaning that the traces 520 extend perpendicularly to the pad so as to be the shortest distance possible between pads. Gaps 540 between the conductive pads are sized to allow a laser to penetrate beneath the sensing pad 500 so as to melt frit there below. The width of the conductive pads 510 and the gaps 540 depend on the design, but generally the width of the conductive pads 510 is wider than the gaps 540. The pressure sensor generally includes a plurality of sensing pads coupled in parallel so that pressure can be sensed in different regions of the display separately.

A different configuration of a sensing pad is shown at 550. In this configuration, sub-portions or conductive pads 552 are coupled in series through signal traces 554. However, the signal traces are at an angle relative to a shortest direction of travel between the conductive pads. The angled connection allows minimal exposure of the traces to a laser that passes over the sensing pads to melt frit positioned below the sensing pads. The direction of travel of the laser is shown at 560, and the traces 554 are designed to be at an angle with respect to the direction of laser travel. For example, the traces can extend from a front end of one conductive pad to a back end of an adjacent conductive pad. Typical angles can be between 30 degrees to 45 degrees. The width of the sensing pads is shown at 570 and 572, and such widths are generally dictated by a number of conductive pads and the gap width between those conductive pads. The widths can be changed based on the design.

Figure 6:
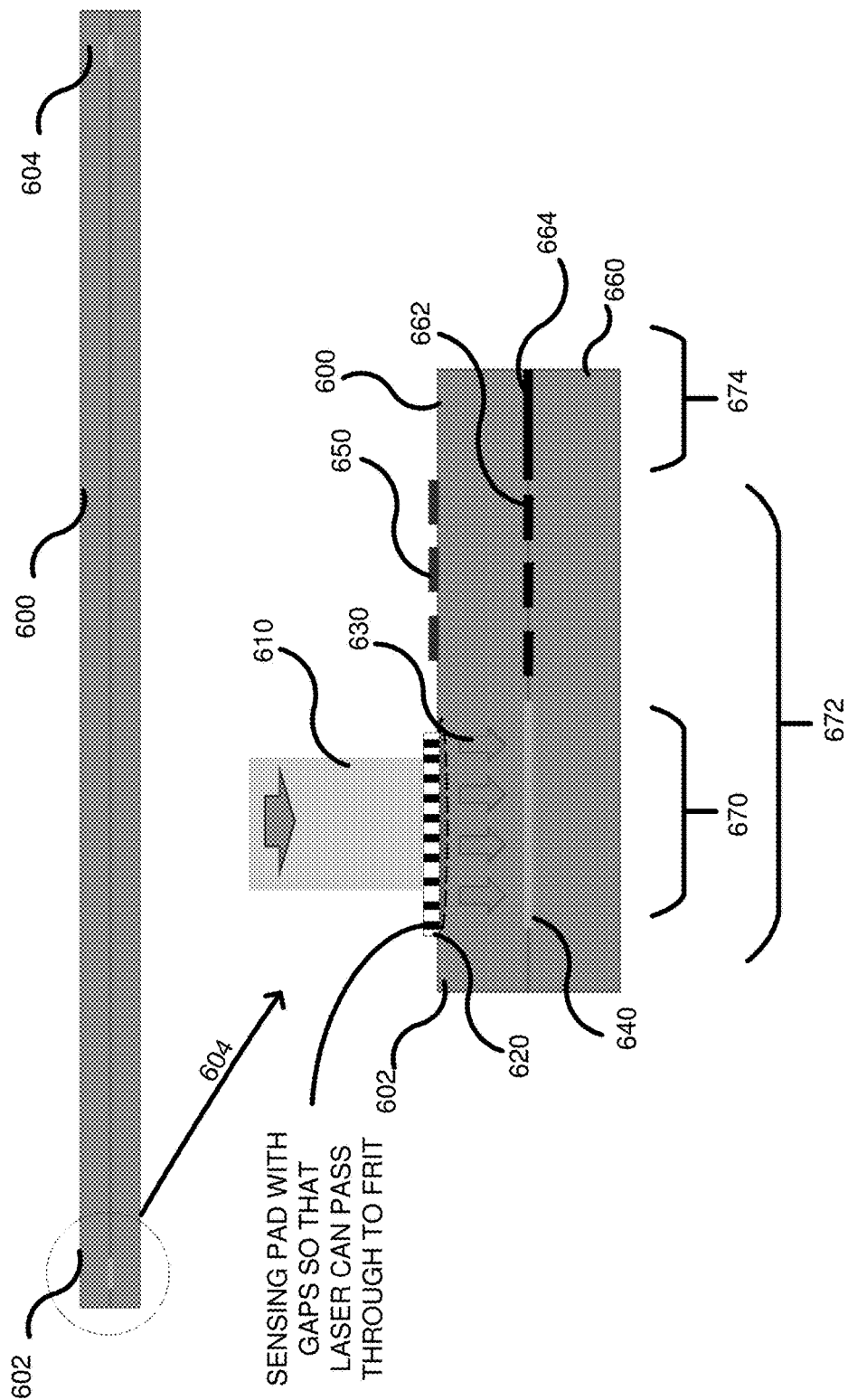
FIG. 6 is a diagram showing a laser being applied to melt a frit layer below the sensor pad of FIG. 4.

FIG. 6 shows a display device 600 having first and second ends (or edges), 602, 604. An expanded view of end 602 is indicated by arrow 604. A laser beam is shown at 610 projecting onto the display device 600. The laser beam 610 can have difficulty penetrating through a metal layer. As a result, a sensing pad 620 can have spaced-apart gaps between serially coupled sub-portions so as to allow the laser light to pass there through as shown at 630. The laser beam 610 can therefore heat a frit layer 640 so as to melt the frit layer. Touch traces 650 are shown as being on a same plane as the sensing pad 620, both of which are on a top surface of a display substrate 660. Pixel related traces 662 are within the display substrate and can be LTPS pixel traces, for example. An active display generation area is shown at 664, which generates display elements that are visible by viewing the display 600. Different areas of the display 600 include a panel seal area 670, an inactive area 672, and an active area 674. Generally, the laser is applied only in the seal area so as to not damage any of the touch traces 650. The gaps within the sensing pad 620 allow the sensing pad to be positioned above the frit layer 640 to conserve space within the inactive area 672.

Figure 7:
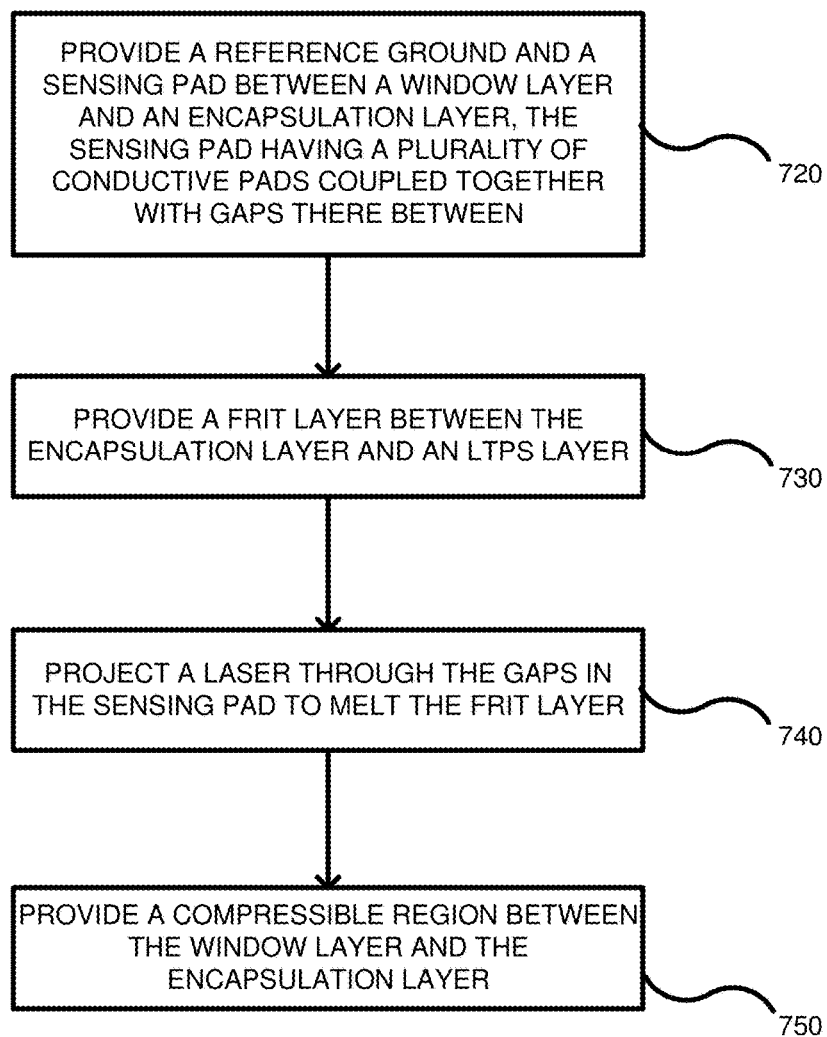
FIG. 7 is a flowchart of a method for melting frit through the sensor pad.

FIG. 7 is a flowchart of a method for assembling a display. In process block 720, a reference ground layer and a sensing pad are positioned between a window layer and an encapsulation layer. The sensing pad can have a plurality of conductive pads coupled together with gaps there between. The conductive pads can be sub-portions of the sensing pad and can be coupled together in series. Other sensing pads in the pressure sensor can then be coupled in parallel with the sensing pad. In process block 730, a frit layer can be provided between an encapsulation layer and an LTPS layer. The frit layer can be used to bond the encapsulation layer and LTPS layer together. In process block 740, a laser beam can be projected through the gaps in the sensing pad to melt the frit layer. The laser beam does not adequately project through the conductive pads, so the gaps between the conductive pads make the sensing pad transparent enough to the laser beam so as to melt the frit continuously along its length. In process block 750, a compressible region is provided between the window layer and the encapsulation layer. The compressible region can be a compressible adhesive, such as an optically clear adhesive.

Figure 8:
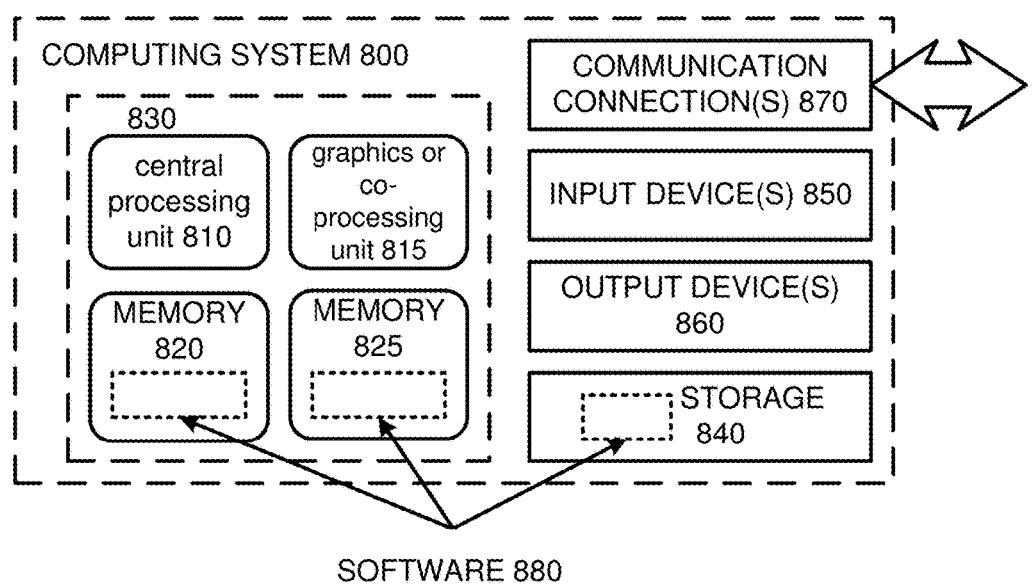
FIG. 8 shows an embodiment of a computing system that can be used in conjunction with the sensor or can house the display.

FIG. 8 depicts a generalized example of a suitable computing system 800 in which the described innovations may be implemented. The computing system 800 is not intended to suggest any limitation as to scope of use or functionality, as the innovations may be implemented in diverse general-purpose or special-purpose computing systems.

With reference to FIG. 8, the computing system 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC), or any other type of processor. Such a processor can be used to read an output from the sensing pad, as was illustrated in FIG. 1. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing system 800 includes storage 840, one or more input devices 850, one or more output devices 860, and one or more communication connections 870. An interconnection mechanism (not shown) such as a bus, controller, or network interconnects the components of the computing system 800. Typically, operating system software (not shown) provides an operating environment for other software executing in the computing system 800, and coordinates activities of the components of the computing system 800.

The tangible storage 840 may be removable or non-removable, and includes magnetic disks, magnetic tapes or cassettes, CD-ROMs, DVDs, or any other medium which can be used to store information and which can be accessed within the computing system 800. The storage 840 stores instructions for the software 880.

The input device(s) 850 may be a touch input device such as a touch display, a keyboard, mouse, pen, or trackball, a voice input device, a scanning device, or another device that provides input to the computing system 800. For video encoding, the input device(s) 850 may be a camera, video card, TV tuner card, or similar device that accepts video input in analog or digital form, or a CD-ROM or CD-RW that reads video samples into the computing system 800. The output device(s) 860 may be a display, printer, speaker, CD-writer, or another device that provides output from the computing system 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 8, computer-readable storage media include memory 820 and 825, and storage 840.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

The following paragraphs further describe embodiments of the devices:

A. A display device including a pressure sensor, comprising:
 a window substrate;
 a display substrate for displaying images on the display device;
 a reference ground layer between the window substrate and the display substrate;
 a compression region that is compressible when force is applied to the window substrate, the compression region being positioned between the window substrate and the display substrate; and
 a sensing pad below the compression region, wherein pressure on the window substrate is detected due to a change of capacitance between the reference ground and the sensing pad.

B. The pressure sensor of paragraph A, wherein the compression region is an adhesive, a polymer or a combination thereof.

C. The pressure sensor of any of paragraphs A-B, wherein the reference ground layer is adjacent to the window substrate.

D. The pressure sensor of any of paragraphs A-C, wherein the display substrate includes an encapsulation glass.

E. The pressure sensor of any of paragraphs A-D, further including a polarizer layer between the compression region and the display substrate, and wherein the sensing pad is between the polarizer region and the display substrate.

F. The pressure sensor of any of paragraphs A-E, wherein the sensing pad is aligned with a frit layer.

G. The pressure sensor of paragraph F, wherein the sensing pad has spaced-apart sub-portions that are connected in series with gaps between the sub-portions.

H. The pressure sensor of paragraph G, wherein sizing of the gaps is such that a laser can continuously melt the frit layer.

I. The pressure sensor of paragraph G, wherein electrical connections between the spaced-apart sub-portions are angled so as to minimize exposure of the electrical connections to the laser.

J. The pressure sensor of any of paragraphs A-I, wherein the window substrate is made of glass or plastic.

K. A display including a pressure sensor, comprising:
a window substrate having an active area wherein display elements are displayed and an inactive area wherein display elements are not displayed;
an encapsulation substrate positioned in parallel with the window substrate;
a display substrate coupled to the encapsulation substrate, the display substrate having electronics therein for generating the display elements to be displayed through the window substrate;
a frit material between the encapsulation substrate and the display substrate, the frit material overlapping with the inactive area;
a reference ground layer, which is a first part of a pressure sensor, positioned between the window substrate and the encapsulation substrate; and
a sensing pad, which is a second part of the pressure sensor, spaced apart from the reference ground layer.

L. The display of paragraph K, wherein the sensing pad is positioned between the encapsulation substrate and the reference ground layer in the inactive area.

M. The display of any of paragraphs K-L, wherein the display substrate is a low-temperature polycrystalline silicon (LTPS).

N. The display of any of paragraphs K-M, further including a compressible region between the reference ground layer and the encapsulation substrate.

O. The display of paragraph N, wherein the compressible region is a compressible adhesive.

P. The display of paragraph N, wherein the sensing pad includes a plurality of spaced-apart conductive portions coupled in series.

Q. The display of paragraph P, wherein the spacing between the conductive portions is sized to allow a laser to pass through the sensing pad and melt the frit material.

R. A method of assembling a display including a pressure sensor, comprising:
providing a reference ground and sensing pad between a window layer and an encapsulation layer, the sensing pad having a plurality of conductive pads coupled together in series through signal traces with gaps between the conductive pads;
providing a frit layer between the encapsulation layer and a low-temperature polycrystalline silicon (LTPS) layer;
projecting a laser through the gaps in the sensing pad to melt the frit layer; and
providing a compressible region between the window layer and the encapsulation layer.

S. The method of paragraph R, wherein the compressible region is a compressible adhesive.

T. The method of any of paragraphs R-S, wherein the reference ground is adjacent to the window layer and the sensing pad is adjacent to the encapsulation layer.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A display device including a pressure sensor, comprising:
a window substrate;
a display substrate for displaying images on the display device;
an encapsulation glass adjacent the display substrate;
a frit layer between the display substrate and the encapsulation glass that bonds the display substrate and encapsulation glass together, the frit layer being within an inactive area of the display;
a reference ground layer between the window substrate and the display substrate;
a compression region that is compressible when force is applied to the window substrate, the compression region being positioned between the window substrate and the display substrate; and
a sensing pad aligned over the frit layer and below the compression region, wherein pressure on the window substrate is detected due to a change of capacitance between the reference ground and the sensing pad, wherein the sensing pad has spaced-apart sub-portions in the inactive area of the display.

2. The display device of claim 1, wherein the reference ground layer is adjacent to the window substrate.

3. The display device of claim 1, further including a polarizer layer between the compression region and the display substrate, and wherein the sensing pad is between the polarizer region and the display substrate.

4. The display device of claim 1, wherein sizing of gaps between the sub-portions is such that a laser can continuously melt the frit layer.

5. The display device of claim 1, wherein electrical connections between the spaced-apart sub-portions are angled so as to minimize exposure of the electrical connections to the laser.

6. The display device of claim 1, wherein the window substrate is made of glass or plastic.

7. A display including a pressure sensor, comprising:
a window substrate having an active area wherein display elements are displayed and an inactive area wherein display elements are not displayed;
an encapsulation substrate positioned in parallel with the window substrate;
a display substrate coupled to the encapsulation substrate, the display substrate having electronics therein for generating the display elements to be displayed through the window substrate;
a frit material between the encapsulation substrate and the display substrate used to bond the encapsulation substrate and the display substrate, the frit material overlapping with the inactive area;
a reference ground layer, which is a first part of the pressure sensor, positioned between the window substrate and the encapsulation substrate; and
a sensing pad, which is a second part of the pressure sensor, spaced apart from the reference ground layer, the sensing pad including spaced-apart conductive portions within the inactive area aligning with the frit material.

8. The display of claim 7, wherein the sensing pad is positioned between the encapsulation substrate and the reference ground layer in the inactive area.

9. The display of claim 7, wherein the display substrate is a low-temperature polycrystalline silicon (LTPS).

10. A method of assembling a display including a pressure sensor, comprising:
provide a reference ground and sensing pad between a window layer and an encapsulation layer, the sensing pad having a plurality of conductive pads with gaps between the conductive pads;
providing a frit layer between the encapsulation layer and a low-temperature polycrystalline silicon (LTPS) layer, the frit layer being within an inactive area of the display, wherein the sensing pad is aligned with the frit layer in the inactive area;
projecting a laser through the gaps in the sensing pad to melt the frit layer; and
providing a compressible region between the window layer and the encapsulation layer.

11. The method of claim 10, wherein the reference ground is adjacent to the window layer and the sensing pad is adjacent to the encapsulation layer.

12. The display of claim 7, wherein spacing between the conductive portions is sized to allow a laser to pass through the sensing pad and melt the frit material.

* * * * *